US012168286B2

(12) United States Patent
Wu

(10) Patent No.: US 12,168,286 B2
(45) Date of Patent: Dec. 17, 2024

(54) LOCKING PLIERS

(71) Applicant: Ming Chieh Wu, Taichung (TW)

(72) Inventor: Ming Chieh Wu, Taichung (TW)

( * ) Notice: Subject to any disclaimer, the term of this patent is extended or adjusted under 35 U.S.C. 154(b) by 304 days.

(21) Appl. No.: 17/736,139

(22) Filed: May 4, 2022

(65) Prior Publication Data

US 2023/0330817 A1 Oct. 19, 2023

(30) Foreign Application Priority Data

Apr. 13, 2022 (TW) ................................ 111114058

(51) Int. Cl.
*B25B 7/12* (2006.01)
*B25B 7/18* (2006.01)

(52) U.S. Cl.
CPC ................ *B25B 7/123* (2013.01); *B25B 7/18* (2013.01)

(58) Field of Classification Search
CPC .... B25B 7/00; B25B 7/02; B25B 7/08; B25B 7/12; B25B 7/123; B25B 7/14; B25B 7/16; B25B 7/22
See application file for complete search history.

(56) References Cited

U.S. PATENT DOCUMENTS 2,685,218 A * 8/1954 Burns .................... B25B 7/123 81/380
3,195,382 A * 7/1965 Rommel ................ B25B 7/123 81/368
3,854,354 A * 12/1974 Angquist ............... B25B 7/123 81/377
6,450,070 B1 * 9/2002 Winkler ................. B25B 7/123 81/367
6,626,070 B2 9/2003 Peperkorn et al.
11,383,357 B2 * 7/2022 Wu .......................... B25B 7/06
2008/0173143 A1 7/2008 Wu
2011/0107880 A1 * 5/2011 Stucky ................... B25B 7/123 81/370
2020/0368879 A1 11/2020 Wu
2022/0234172 A1 * 7/2022 Eggert ..................... B25B 7/16

* cited by examiner

*Primary Examiner* — Robert J Scruggs
(74) *Attorney, Agent, or Firm* — MUNCY, GEISSLER, OLDS & LOWE, P.C.

(57) ABSTRACT

A locking pliers includes a first plier and a second plier. The first plier includes a first handle, a first jaw, and an adjusting member. The second plier includes a second jaw, a first connecting member, a toggle link, and a second handle. The second jaw has a first pivoting portion and a second pivoting portion. The first pivoting portion is pivotally connected to the first handle. The first connecting member is pivotally connected to the second pivoting portion. The toggle link is abutted against the adjusting member and has a third pivoting portion pivotally connected to the first connecting member. The second handle is connected to the first connecting member. A first length defined between the first pivoting portion and the second pivoting portion is less than a second length defined between the second pivoting portion and the third pivoting portion.

6 Claims, 5 Drawing Sheets

LOCKING PLIERS

BACKGROUND OF THE INVENTION

The present invention relates to a locking pliers and, more particularly, to a one-hand operated locking pliers, which includes a reduced distance between a fixed handle and a movable handle when the locking pliers is in an open position.

U.S. Pat. No. 6,626,070 discloses a locking pliers includes a body having a fixed handle and a fixed jaw, a movable jaw coupled with the body, and a movable handle coupled with the movable jaw and pivotally linked to a toggle locking mechanism to lock the jaws in a closed position. The toggle locking mechanism includes a compound link pivotally connected to the movable handle and to a toggle link, and a retention means for restricting pivotal movement of the compound link relative to the movable handle.

However, a distance between the movable handle and the fixed handle is very large when the jaws in an open position. In particular, since the jaws are further opened, the greater the distance between the movable handle and the fixed handle. The hand of the user could be not big enough for the one-hand operation.

Thus, a need exists for a novel locking pliers that mitigates and/or obviates the above drawbacks.

BRIEF SUMMARY OF THE INVENTION

An objective of the present invention is to provide a locking pliers, which includes a first plier and a second plier. The first plier includes a first handle, a first jaw connected to one end of the first handle, and an adjusting member connected to the other end of the first handle opposite to the first jaw. The second plier includes a second jaw, a first connecting member, a toggle link, and a second handle. The second jaw has a first pivoting portion and a second pivoting portion. The first pivoting portion is pivotally connected to the first handle to cause the second jaw and the first jaw faced to each other. The first connecting member is pivotally connected to the second pivoting portion. One end of the toggle link is abutted against the adjusting member and the other end of the toggle link has a third pivoting portion pivotally connected to the first connecting member. The second handle is connected to one end of the first connecting member opposite to the second jaw. A first length is defined between the first pivoting portion and the second pivoting portion, and a second length is defined between the second pivoting portion and the third pivoting portion. The second length is greater than the first length.

In an example, the second length is greater than 1.1 times the first length and less than 1.5 times the first length.

In an example, a third length is defined between the end of the toggle link abutted against the adjusting member and the third pivoting portion. The third length is greater than 1.3 times the second length and less than 1.7 times the second length.

In an example, the first connecting member is provided with a sliding groove. The second plier is provided with a first pin inserting through the second handle and being slidable in relation to the sliding groove. The first pin selectively abuts against the toggle link or detaches from the toggle link when the first pin slides in relation to the sliding groove.

In an example, the first connecting member has a U-shaped cross section and is provided with two first lateral plates parallel each other and a first central plate connected between the two first lateral plates. The second handle has a U-shaped cross section and is provided with two second lateral plates parallel each other and a second central plate connected between the two second lateral plates. The two second lateral plates are faced two opposite sides of the first connecting member, and the second central plate is faced to a side of the first central plate opposite to the first handle. The sliding groove penetrates through the two first lateral plates. The first pin passes through the sliding groove and inserts through the two second lateral plates.

In an example, the second plier includes a second pin and a biasing member. The second pin inserts through the two second lateral plates. The biasing member has a portion wrapped around an outer periphery of the second pin for several circles, a first end abutting against a side of the first central plate adjacent to the first handle, and a second end abutting against a side of the second central plate adjacent to the first handle.

In an example, the end of the first connecting member opposite to the second jaw forms a flange limited between the second pin and the second central plate. The flange is biased by the biasing member to regularly contact with the second pin.

In an example, one end of the toggle link adjacent to the first connecting member forms a contact portion. The first pin selectively abuts against the contact portion or detaches from the contact portion when the first pin slides in relation to the sliding groove. The contact portion is a convex surface.

The present invention will become clearer in light of the following detailed description of illustrative embodiments of this invention described in connection with the drawings.

DETAILED DESCRIPTION OF THE INVENTION

Figure 1:
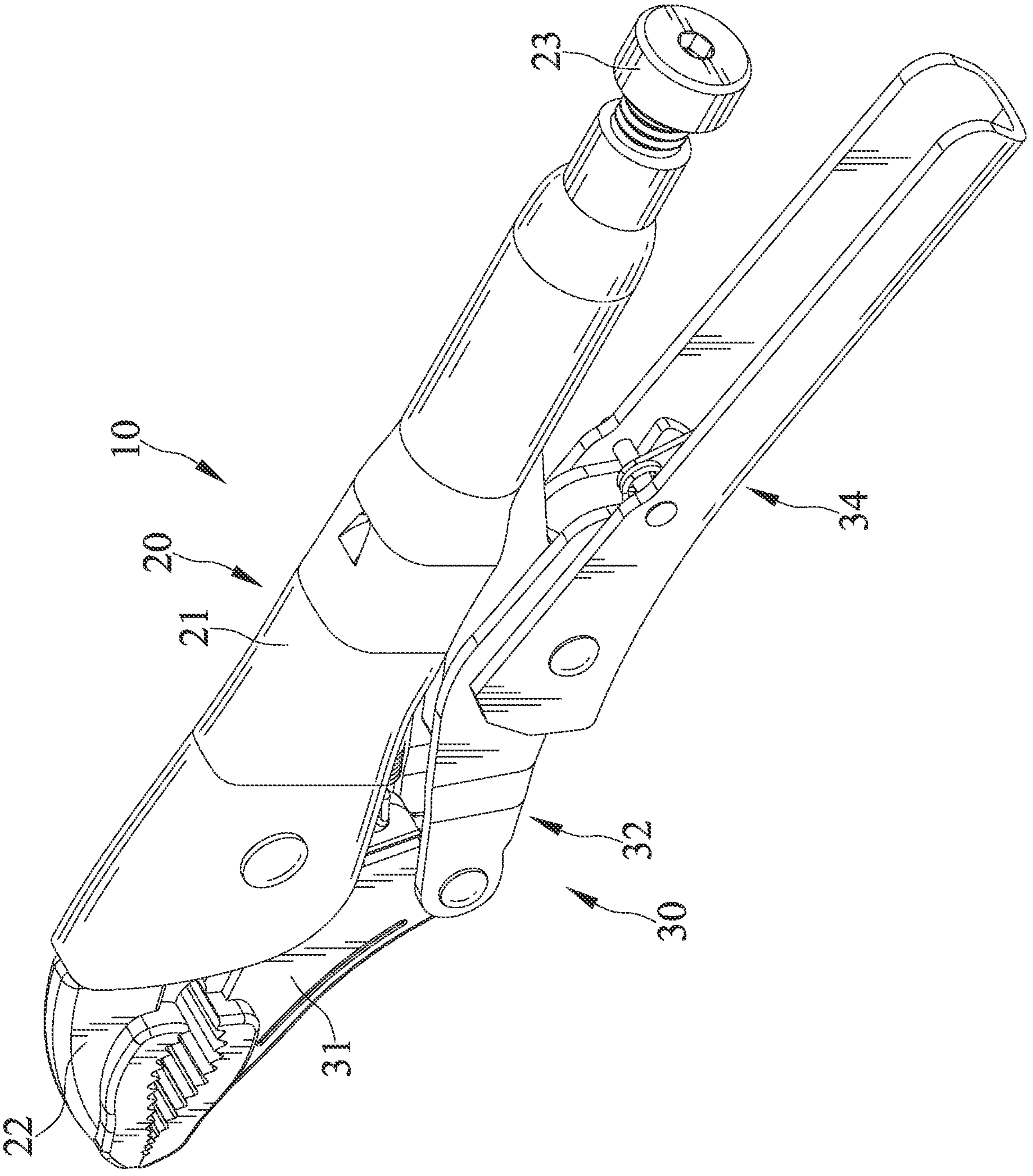
FIG. 1 is a perspective view of a locking pliers of an embodiment according to the present invention.
Figure 2:
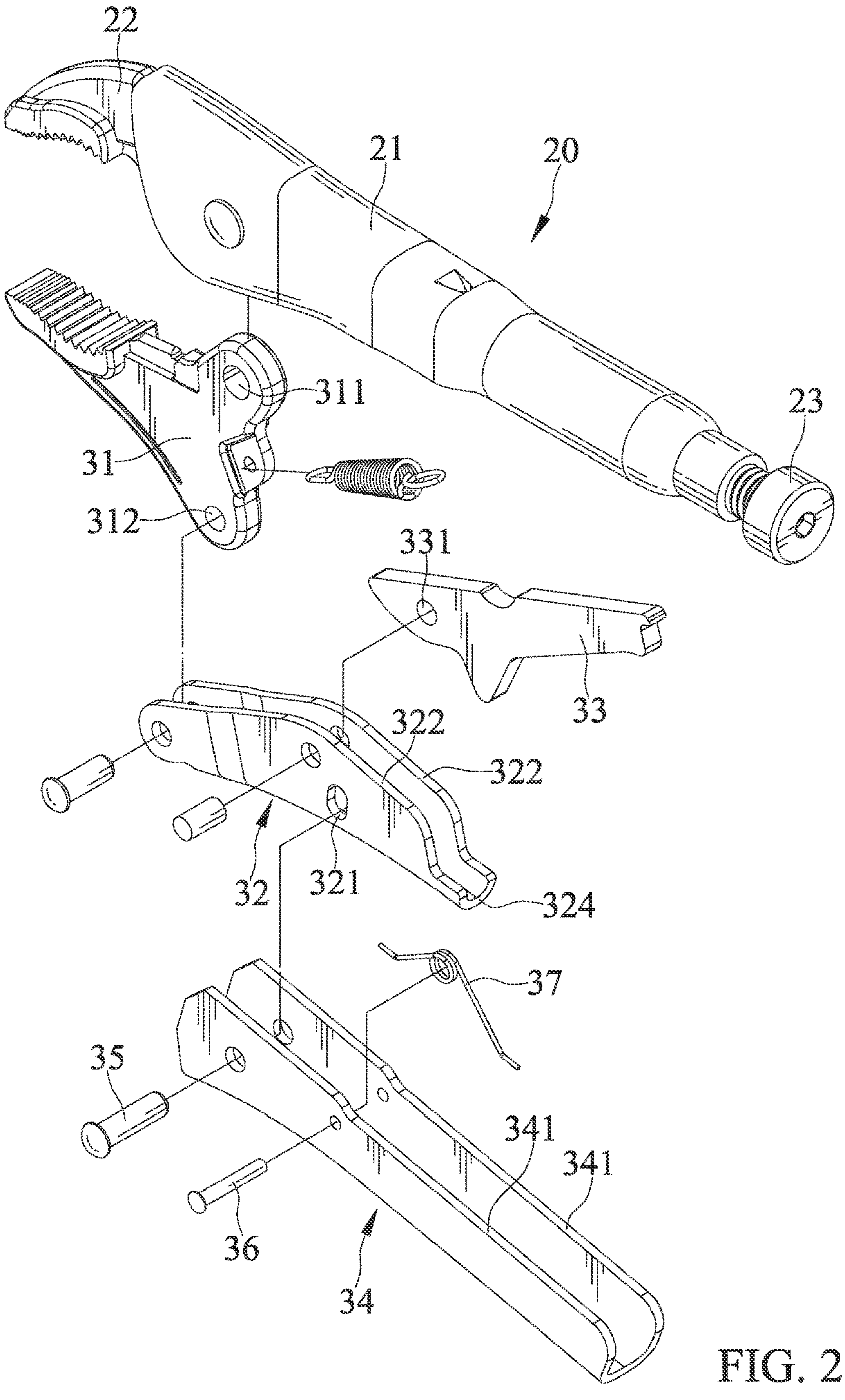
FIG. 2 is an exploded, perspective view of the locking pliers of FIG. 1.
Figure 3:
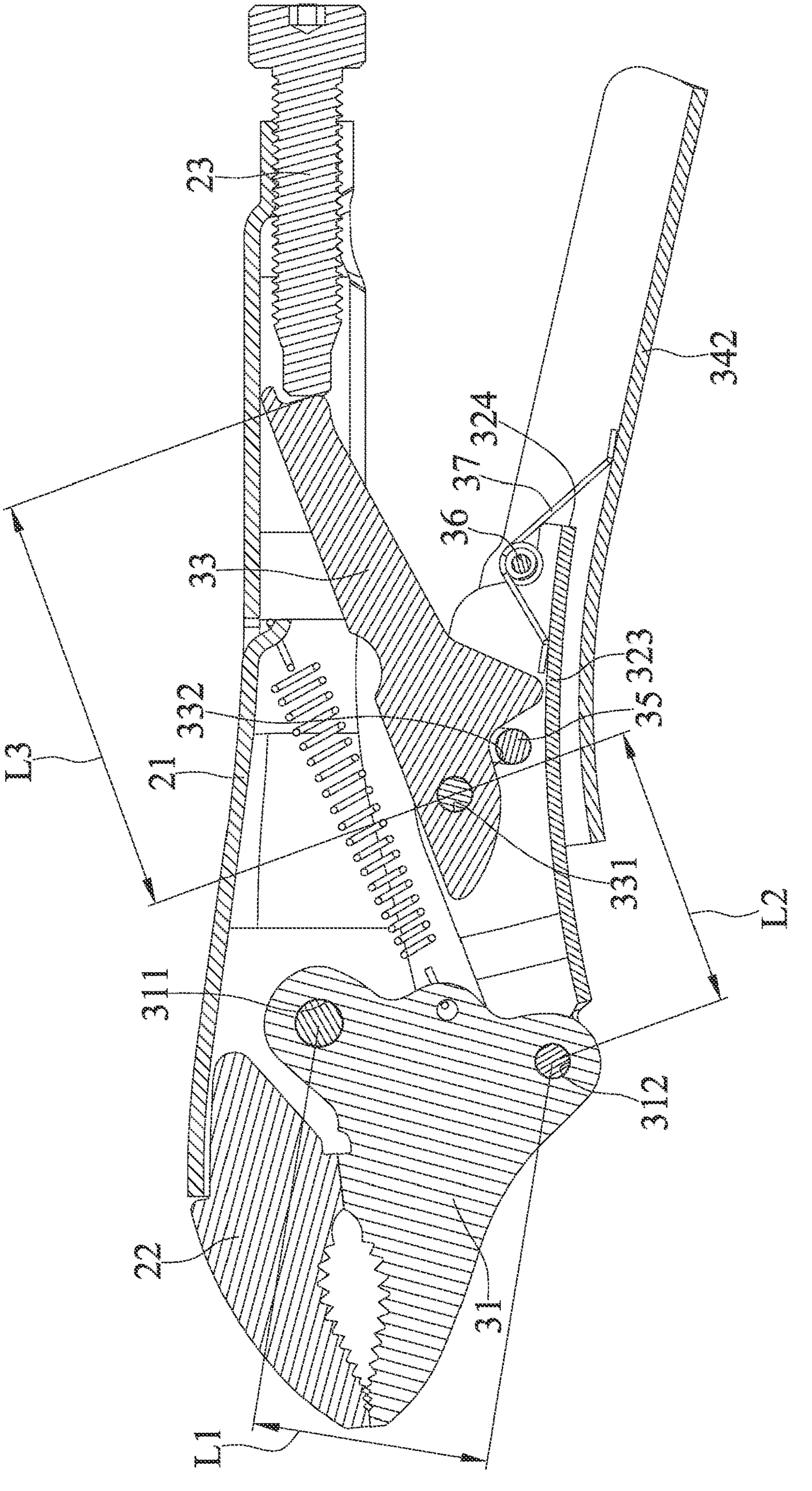
FIG. 3 is a cross sectional view of the locking pliers of FIG. 1, and shows the locking pliers is in a close position.
Figure 4:
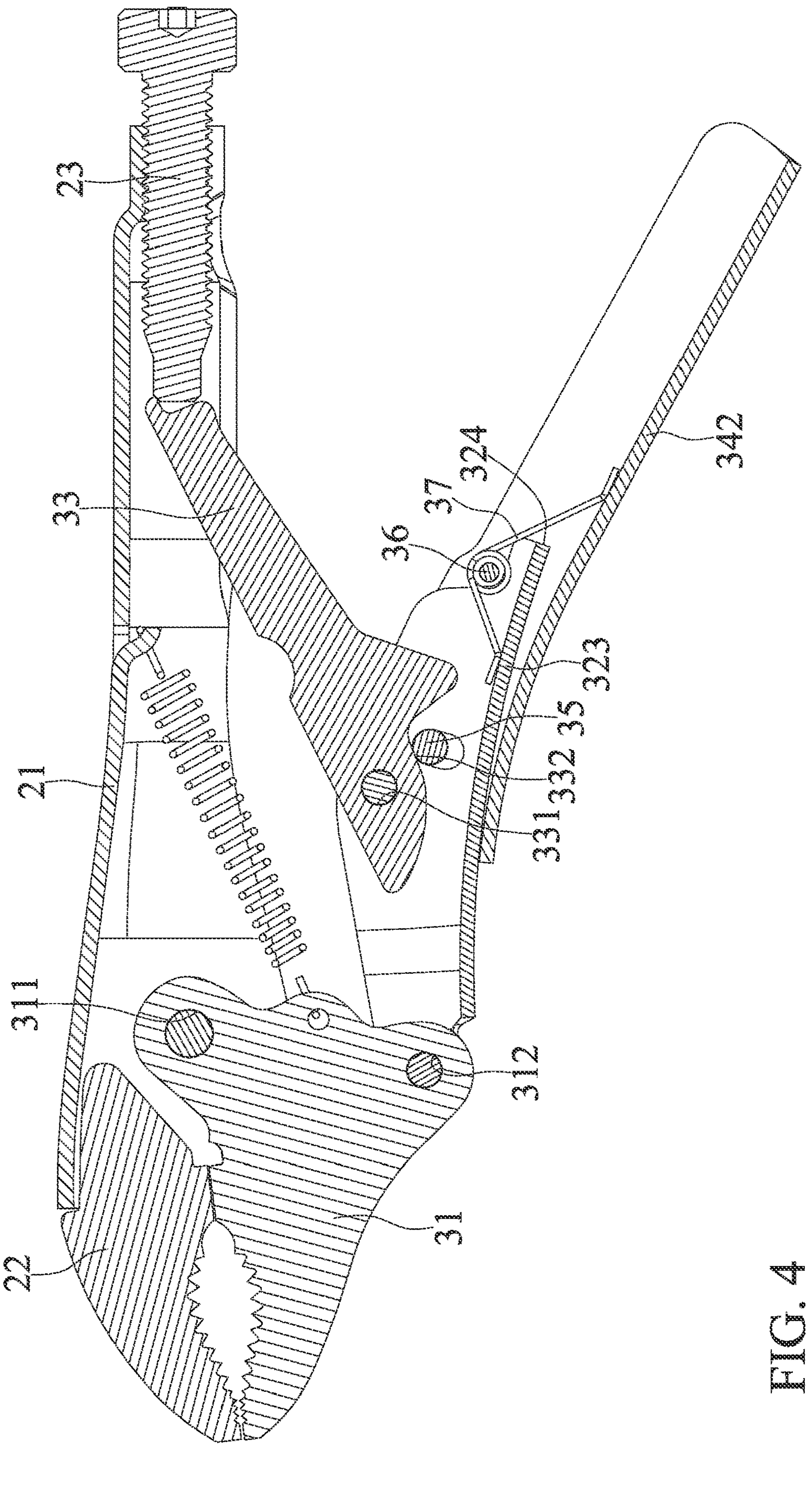
FIG. 4 is a cross sectional view of the locking pliers of FIG. 1, and shows the locking pliers is in a transition position between the close position and an open position.
Figure 5:
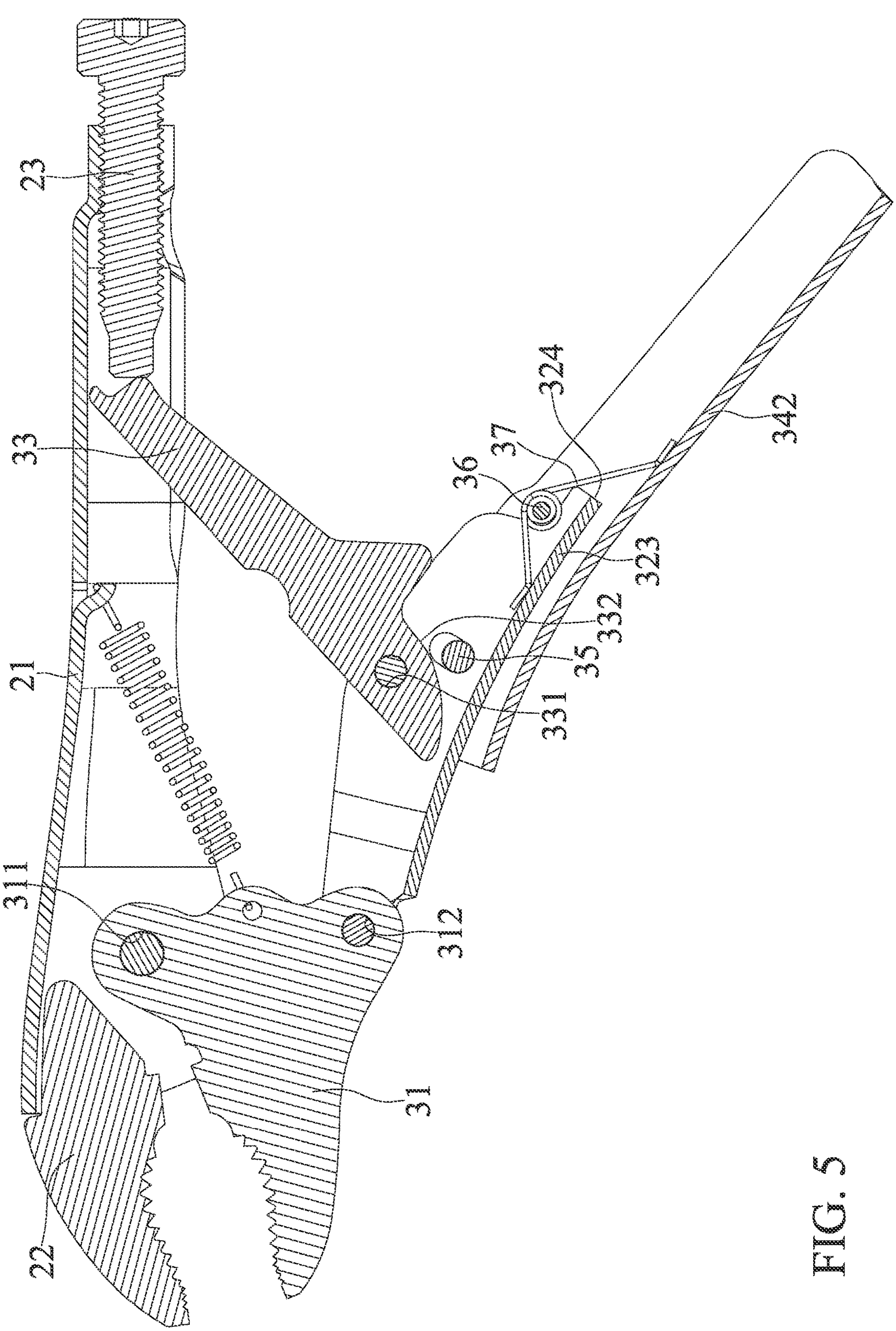
FIG. 5 is a cross sectional view of the locking pliers of FIG. 1, and shows the locking pliers is in the open position.

FIGS. 1-5 show a locking pliers 10 of an embodiment according to the present invention. The locking pliers 10 includes a first plier 20 and a second plier 30. The first plier 20 includes a first handle 21, a first jaw 22 connected to one end of the first handle 21, and an adjusting member 23 connected to the other end of the first handle 21 opposite to the first jaw 22.

The second plier 30 includes a second jaw 31, a first connecting member 32, a toggle link 33, and a second handle 34. The second jaw 31 has a first pivoting portion 311 and a second pivoting portion 312. The first pivoting portion 311 is pivotally connected to the first handle 21 to cause the second jaw 31 and the first jaw 22 faced to each other. The first connecting member 32 is pivotally connected to the second pivoting portion 312. One end of the toggle link 33 is abutted against the adjusting member 23 and the other end of the toggle link 33 has a third pivoting portion 331 pivotally connected to the first connecting member 32. The second handle 34 is connected to one end of the first connecting member 32 opposite to the second jaw 31. A first length L1 is defined between the first pivoting portion 311 and the second pivoting portion 312, and a second length L2 is defined between the second pivoting portion 312 and the third pivoting portion 331. The second length L2 is greater than the first length L1.

In the embodiment, the second length L2 may be greater than 1.1 times the first length L1 and less than 1.5 times the first length L1.

Further, a third length L3 is defined between the end of the toggle link 33 abutted against the adjusting member 23 and the third pivoting portion 331. The third length L3 is greater than 1.3 times the second length L2 and less than 1.7 times the second length L2.

The first connecting member 32 is provided with a sliding groove 321. The second plier 30 is provided with a first pin 35 inserting through the second handle 34 and being slidable in relation to the sliding groove 321. The first pin 35 selectively abuts against the toggle link 33 or detaches from the toggle link 33 when the first pin 35 slides in relation to the sliding groove 321.

The first connecting member 32 has a U-shaped cross section and is provided with two first lateral plates 322 parallel each other and a first central plate 323 connected between the two first lateral plates 322. The second handle 34 has a U-shaped cross section and is provided with two second lateral plates 341 parallel each other and a second central plate 342 connected between the two second lateral plates 341.

The two second lateral plates 341 are faced two opposite sides of the first connecting member 32, and the second central plate 342 is faced to a side of the first central plate 323 opposite to the first handle 21. The sliding groove 321 penetrates through the two first lateral plates 322. The first pin passes through the sliding groove 321 and inserts through the two second lateral plates 341.

The second plier 30 includes a second pin 36 and a biasing member 37. The second pin 36 inserts through the two second lateral plates 341. The biasing member 37 has a portion wrapped around an outer periphery of the second pin 36 for several circles, a first end abutting against a side of the first central plate 323 adjacent to the first handle 21, and a second end abutting against a side of the second central plate 342 adjacent to the first handle 21.

The end of the first connecting member 32 opposite to the second jaw 31 forms a flange 324 limited between the second pin 36 and the second central plate 342, and the flange 324 is biased by the biasing member 37 to regularly contact with the second pin 36.

One end of the toggle link 33 adjacent to the first connecting member 32 forms a contact portion 332. The first pin 35 selectively abuts against the contact portion 332 or detaches from the contact portion 332 when the first pin 35 slides in relation to the sliding groove 321. The contact portion 332 is a convex surface.

When the locking pliers 10 is in an open position, the first length L1, the second length L2, and the third length L3 are designed in a specific ratio to reduce the angle change of the first connecting member 32, so as a distance between the two handles 21 and 34 is reduced when the locking pliers 10 is opened. Thus, the user can hold the two handles 21 and 34 with one hand to operate the locking pliers 10.

Although specific embodiments have been illustrated and described, numerous modifications and variations are still possible without departing from the scope of the invention. The scope of the invention is limited by the accompanying claims.

The invention claimed is:

1. A locking pliers comprising:

a first plier including a first handle, a first jaw connected to one end of the first handle, and an adjusting member connected to the other end of the first handle opposite to the first jaw; and a second plier including a second jaw, a first connecting member, a toggle link, and a second handle, wherein the second jaw has a first pivoting portion and a second pivoting portion, wherein the first pivoting portion is pivotally connected to the first handle to cause the second jaw and the first jaw faced to each other, wherein the first connecting member is pivotally connected to the second pivoting portion, wherein one end of the toggle link is abutted against the adjusting member and the other end of the toggle link has a third pivoting portion pivotally connected to the first connecting member, and wherein the second handle is connected to one end of the first connecting member opposite to the second jaw;

wherein a first length is defined between the first pivoting portion and the second pivoting portion, wherein a second length is defined between the second pivoting portion and the third pivoting portion, and wherein the second length is greater than the first length;

wherein the first connecting member is provided with a sliding groove, wherein the second plier is provided with a first pin inserting through the second handle and being slidable in relation to the sliding groove, and wherein the first pin selectively abuts against the toggle link or detaches from the toggle link when the first pin slides in relation to the sliding groove;

wherein the first connecting member has a U-shaped cross section and is provided with two first lateral plates parallel each other and a first central plate connected between the two first lateral plates, wherein the second handle has a U-shaped cross section and is provided with two second lateral plates parallel each other and a second central plate connected between the two second lateral plates, wherein the two second lateral plates are faced to opposite sides of the first connecting member, and the second central plate is faced to a side of the first central plate opposite to the first handle, wherein the sliding groove penetrates through the two first lateral plates, and wherein the first pin passes through the sliding groove and inserts through the two second lateral plates.

2. The locking pliers as claimed in claim 1, wherein the second length is greater than 1.1 times the first length and less than 1.5 times the first length.

3. The locking pliers as claimed in claim 1, wherein a third length is defined between the end of the toggle link abutted against the adjusting member and the third pivoting portion, and wherein the third length is greater than 1.3 times the second length and less than 1.7 times the second length.

4. The locking pliers as claimed in claim 1, wherein the second plier includes a second pin and a biasing member, wherein the second pin inserts through the two second lateral plates, and wherein the biasing member has a portion wrapped around an outer periphery of the second pin for several circles, a first end abutting against a side of the first central plate adjacent to the first handle, and a second end abutting against a side of the second central plate adjacent to the first handle.

5. The locking pliers as claimed in claim 4, wherein the end of the first connecting member opposite to the second jaw forms a flange limited between the second pin and the second central plate, and wherein the flange is biased by the biasing member to regularly contact with the second pin.

6. The locking pliers as claimed in claim 1, wherein one end of the toggle link adjacent to the first connecting member forms a contact portion, wherein the first pin selectively abuts against the contact portion or detaches from the contact portion when the first pin slides in relation to the sliding groove, and wherein the contact portion is a convex surface.

* * * * *